United States Patent [19]

Percheron et al.

[11] Patent Number: 5,083,469
[45] Date of Patent: Jan. 28, 1992

[54] METHODS AND DEVICES FOR PLACING MULTIPLE STRAND CABLES UNDER TENSION

[75] Inventors: Jean-Claude Percheron, Vienne en Arthies, France; Andre Stouffs, Brussels, Belgium

[73] Assignee: Freyssinet International (STUP), France

[21] Appl. No.: 592,377

[22] Filed: Oct. 3, 1990

[30] Foreign Application Priority Data

Oct. 5, 1989 [FR] France ............................. 89 13020

[51] Int. Cl.⁵ ............................................. G01L 5/04
[52] U.S. Cl. ................................. 73/862.42; 403/367; 403/374; 29/452
[58] Field of Search ............. 254/29 A; 29/452; 403/314, 367, 369, 371, 374; 14/21, 22; 73/862.42, 862.39; 52/230, 225

[56] References Cited

U.S. PATENT DOCUMENTS

| | | | |
|---|---|---|---|
| 2,328,364 | 8/1943 | Taylor | 73/862.42 |
| 2,637,895 | 5/1953 | Blaton | 29/452 |
| 3,868,850 | 3/1975 | Davison et al. | 73/862.42 |
| 4,960,001 | 10/1990 | Vemmer | 73/862.39 |

Primary Examiner—Peter M. Cuomo
Attorney, Agent, or Firm—Larson and Taylor

[57] ABSTRACT

For placing a multiple strand cable under tension by successive tightening of the different strands by means of an individual jack, procedure is as follows: the first strand of the cable is tightened, called below "control strand" while keeping possible then measurement of the tension of this strand at any moment, then pulling a second strand until its tension is equal to that of the control strand, measured at the same moment, and then anchoring this second strand so stretched, a third strand is then tightened until its tension is equal to that of the control strand measured at the corresponding moment and then this third strand so tightened is anchored, and so on until the anchoring of the last strand, after which the tension then applied to the control strand is noted and, after having relaxed the latter and having freed from it the measuring means, this control strand is anchored while applying to it the tension thus noted.

6 Claims, 1 Drawing Sheet

METHODS AND DEVICES FOR PLACING MULTIPLE STRAND CABLES UNDER TENSION

BACKGROUND OF THE INVENTION

The invention relates to methods and devices for placing under tension, multiple strand cables such as those constituting stays which serve for supporting bridge decks or for stabilizing towers of great height.

In placing such a cable under tension, which is carried out to anchor the second end of this cable on a suitable block, after anchoring its first end on another block, it is convenient to give identical values to the tensions of the different strands or constituent twists of the cable, which are identical with one another, in order that all these strands may participate uniformly in the traction force of the cable.

Such a result can be obtained by exerting the anchoring tension on the whole of the cable, that is to say simultaneously on all of the strands mounted in parallel.

However, it is then necessary to resort to a particularly heavy and bulky tension jack, which can constitute a major drawback, in particular for uses where the head of the cable to be anchored is difficult of access.

To overcome this drawback, it has been proposed to tighten the strands one by one by means of a small individual jack.

However, it is then difficult to obtain identical values for the tension applied successively to the different strands, since the tensioning of each strand eases slightly the previously tightened strands, which modifies the values of the tensions of the different strands in the course of the complete tensioning of the cable.

The formulae which have been proposed until now to overcome this drawback have not given satisfaction, being manifested particularly by very difficult calculations or by sequences of operations particularly delicate to carry out.

SUMMARY OF THE INVENTION

It is a particular object of the invention to overcome very simply the above-indicated drawback.

Accordingly, the method of placing a cable with multiple strands under tension according to the invention again employs successive placing under tension of the different strands by means of an individual jack and it is essentially characterized by the following sequence of operations: a first strand of the cable is placed under tension, called "control strand" below, whilst rendering possible then the measurement of the tension of this strand at each moment, then pulling a second strand until its tension is equal to that of the control strand, measured at the same moment, and then anchoring this second strand so stretched, then pulling a third strand until its tension is equal to that of the control strand measured at the corresponding moment and then achoring this third strand thus stretched and so on up to the anchoring of the last strand, after which the tension then applied to the control strand is noted and, after having slackened the latter and having released the measuring means, this control strand is anchored by applying to it the tension so noted.

As regards devices for employing the method of tensioning defined above, they are essentially characterized according to the invention in that they comprise an individual jack for successively tensioning each of the strands of the cable concerned, means for measuring the tension of the control strand at any moment after its first tensioning, means adaptable successively to each of the strands other than the control strand in the course of its tensioning and adapted to measure the tension so applied to this strand, means for comparing the tension thus measured with that of the control strand at the same moment, and means for stopping automatically the rise in tension of the strand concerned when this comparison shows equality between the two compared tensions.

In preferred embodiments, recourse is had in addition to one and/or other of the following features:

means for measuring the tension applied to the control strand are constituted by a first dynamometric cell surrounding this strand and means for measuring successively the tension applied to each of the other strands are constituted by a second dynamometric cell identical with the first, the anchoring block of the different strands of the cable comprises a plurality of frustoconical holes adapted to receive respectively frustoconical anchoring jaws associated with the different strands and there is provided around the control strand, at the level of said block, a false frustoconical jaw housed in the corresponding frustoconical hole and traversed freely by said control strand, this false jaw serving as a support successively for the dynamometric cell which surrounds the control strand and for an anchoring jaw of said control strand, itself mounted on said cell, the perforated anchoring block according to the preceding paragraph is associated with a plate arranged a slight distance from this block, which plate is perforated on the one hand, by a bore of relatively large diameter adapted to receive and guide the head of the false jaw and, on the other hand, by a plurality of cylindrical bores traversed with slight clearance by the different strands other than the control strand.

The invention comprises, apart from these main features, certain other features which are preferably used at the same time and which will be more explicitly considered below.

In the following, there will be described a preferred embodiment of the invention with reference to the accompanying sheet of drawings given of course as nonlimiting.

DETAILED DESCRIPTION OF THE PREFERRED EMBODIMENTS

Figure 1:
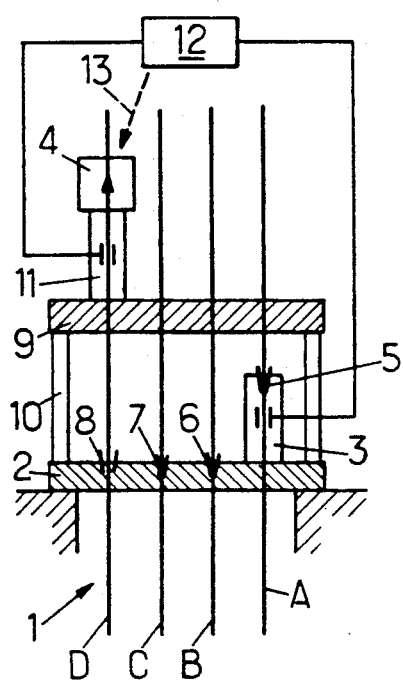
FIG. 1 of this drawing, shows diagrammatically a device for placing a multiple-strand cable under tension, constructed according to the invention.

It is proposed to place under tension a cable or stay 1 composed of a plurality of identical parallel strands or twists which, in FIG. 1, are assumed to be 4 in number and are denoted by the reference numerals A, B, C and D, the number concerned being in reality very much higher and which can reach 100, 200 or even more.

More precisely, it is assumed that a first end of each of these strands, not seen in the drawing, is already anchored in a suitable block and that it is desired to anchor the other end of each strand to a block 2 which is traversed by this other end, whilst applying an identical tension to each of said strands.

The method is commenced by mounting around a section of one of the strands concerned, assumed here to be the strand A, a dynamometric cell 3 enabling the tension applied to said section to be known at any moment.

Then by means of a relatively small jack 4, said strand A is tightened, comprising here its above section, and this strand A is anchored to block 2 when its tension a has reached a predetermined value $a_1$ (this parameter $a_1$ denoting the tension a of the strand A at time $t_1$), for example by means of a frustoconic jaw 5 mounted on the cell 3, which itself is supported on the block 2.

Then the following strand B is placed under tension by means of the jack 4 until its tension b reaches a value equal to that applied at the same moment to the strand A.

This equality is reached at a moment $t_2$ at which the value $a_2$ of the tension applied to the strand A is a little less than its initial tension $a_1$, in view of the fact that the exertion of a tension on the second strand B has the effect of slightly shortening strand A and hence of slightly reducing its tension.

The tension then applied to the strand B at time $t_2$ will be called $b_2$, this value $b_2$ being then equal to $a_2$.

Then the second strand B stretched to said tension $b_2$ is anchored to the block 2.

Then the following strand C is tightened, by means of the preceding jack 4, until its tension c reaches a value equal to that applied at the same moment to strand A.

This equality is reached at a moment $t_3$ at which moment the value $a_3$ of the tension applied to the strand A, which value is equal to the tension $c_3$ then applied to the strand C, is a little less than the two preceding ones $a_1$ and $a_2$.

What is remarkable, is that said tension $a_3$ is then strictly equal to that $b_3$ applied at the same moment to the second strand B due to the fact, that during the tightening of the third strand C, the first two strands A and B can be considered as being mounted in parallel with tensions which vary slightly but remain strictly identical with one another over time.

At the moment $t_3$ indicated above, there is therefore perfect equality between the three tensions $a_3$, $b_3$ and $c_3$.

Then the strand C stretched to the tension $c_3$ is anchored.

Procedure is in the same manner with the following strand D using again the preceding jack 4 until equalization of the tension d applied to this fourth strand with that then applied to the strand A.

When this equalization is obtained at time $t_4$, the tension $d_4$ applied to the strand D is equal not only to that $a_4$ then applied to the strand A, but also to those $b_4$ and $c_4$ applied at the same moment to the two other strands B and C, in view of the fact that, during the tightening of the strand D, the three other strands A, B and C were mounted in parallel with tensions respectively varying slightly, but remaining identical with one another over time.

This is a state of the procedure of tensioning which is shown diagrammatically in FIG. 1.

In this figure, the anchoring jaws 6, 7 are shown gripped against two strands B and C and ensure the respective anchorings of these strands to the block 2 whilst the anchoring jaw 8 applied to the strand D is still in its unclamped state and hence not anchored.

After anchoring the different strands B, C and D to the block 2, the value of the tension which is then shown on the cell 3, is noted, relating to the first strand A, which value is then equal to $a_4$, this strand A is relaxed to release the cell 3 and said strand A is anchored to the block 2 after having applied to the latter a tension equal to $a_4$.

The placing of the cable 1 is then terminated with an equalization of the tensions in each of its constituent strands A, B, C and D.

Of course, the reasoning presented for the tensioning of the three strands B, C and D above can be generalized to the tensioning of any number of strands other than the strand A, the tensioning of each further strand being each time effected with the same jack 4 and up to equalization of its tension with that of the strand A at the same moment, the tension then obtained being that applied to each of the previously stretched strands.

In FIG. 1, it is seen that the jack 4 is not applied directly to the block 2 but to a plate 9 traversed by the heads of the various strands and held at a convenient distance from the block 2 by columns 10.

In addition, this jack 4 is not applied directly against the plate 9, but through a dynamometric cell 11 which is advantageously identical with the cell 3 and which engirdles or encircles the strand concerned.

There is seen also in this Figure at 12 a comparator circuit receiving indications of tension which come respectively from the two cells 3 and 11. The arrow 13 symbolizes the control which is developed by this comparator 12 when there is identity between the two tensions measured respectively by the two cells 3 and 11, and this control can be the stopping of a surge of rise in tension exerted at the level of the jack 4.

Figure 2:
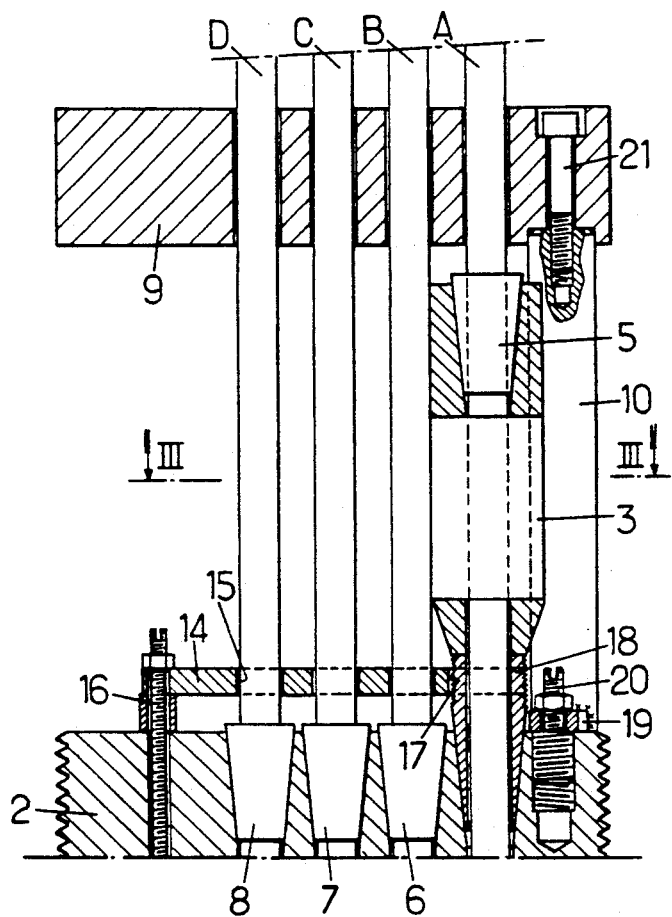
FIGS. 2 and 3 show such a device respectively in axial section along line II—II of FIG. 3 and in cross-section along the line III—III of FIG. 2, with portions removed.
Figure 3:
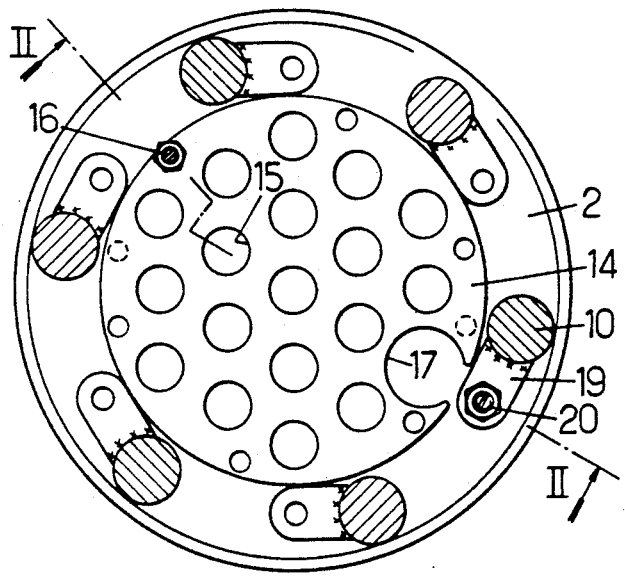

In FIGS. 2 and 3 are to be found again the different elements indicated above by the references 1 to 3 and 5 to 10.

Moreover, these FIGS. 2 and 3 show the following several particularities.

A plate 14 perforated by ports 15 traversed with slight clearance by the strands B, C, D . . . is mounted on small columns 16 at a short distance from the outer surface of the block 2.

This plate 14 has the purpose of maintaining axially the jaws 6, 7, 8 . . . close to their anchoring positions even during the exertion of the anchoring tractions on the heads of the corresponding strands.

In line with the control strand A, said plate 14 is pierced by a hole 17 of greater diameter than the ports 15.

This hole 17 is designed to receive and guide a "false jaw" 18, that is to say a continuous tubular part having an outer frustoconical surface complementary with the inner surface of the corresponding frustoconical housing of the block 2 and an internal cylindrical bore preserving a free passage for the strand A.

This false jaw 18 serves as an axial distance-piece for supporting the cell 3 itself surmounted by the jaw 5 and to transmit to the block 2 the traction forces exerted by the strand A on this jaw 5.

It is also to be seen in FIGS. 2 and 3 that the columns 10 are fixed:

on the one hand, to the block 2 by lugs 19 welded to the bases of these columns and themselves fixed to the block 2 by special bolts 20, and on the other hand, on the plate 9 by bolts 21 screwed axially at the end to said columns.

As a result of which and whatever the embodiment adopted, there is provided a method of placing under individual tension multiple strands of a cable which has many advantages with respect to those previously known, in particular in that it renders possible the tensioning of said strands with the application of identical tensions to the latter by resorting to relatively simple and inexpensive devices.

As is self-evident, and as emerges besides already from the foregoing, the invention is no way limited to those of its types of application and embodiments which have been more especially envisaged; it encompasses thereof, on the contrary, all modifications.

We claim:

1. A device for placing a multiple-strand cable under tension by successively tightening individual strands of the multi-strand cable by using a single tensioning jack, the jack being capable of tightening individual strands of the cable to a selected tension, said device comprising: an individual jack for successively tightening each of the strands of the cable and for simultaneously tightening a first strand and a second or subsequent strand of the cable, means for measuring tension on the first strand, means for measuring the tension successively applied to the remaining strands, means for successively comparing the tension of the remaining strands with that of the first strand while the first strand and one of the remaining strands are simultaneously under tension, and means for automatically terminating the tensioning of each remaining strand as its tension becomes equal to the tension on the first strand such that all strands are placed under equal tension.

2. A device according to claim 1, wherein the means for measuring the tension of the first strand strand comprises a first dynamometric cell encircling the first strand and wherein the means for measuring the tension applied to the second or subsequent strand comprises a second dynamometric cell.

3. A device according to claim 2, including an anchoring block for anchoring the strands of the cable, the anchoring block including a plurality of frustonical holes adapted to receive respectively frustoconical anchoring jaws provided on the strands and wherein there is provided around the first strand, at the level of said block, a false frustoconic jaw housed in a corresponding frustoconical hole freely traversable by said first strand, said false frustoconical jaw serving as a support for the dynamometric cell which surrounds the first strand and for an anchoring jaw of said first strand, said anchoring jaw being mounted on said cell.

4. A device according to claim 3, provided with a plate positioned a short distance from said anchoring block, said plate being perforated by a bore of relatively large diameter adapted to receive and guide a head of the false jaw and also perforated by a plurality of cylindrical bores traversed with slight clearance by the strands other than the first strand.

5. A method for placing a multiple-strand cable under tension by successively tightening individual strands of the multi-strand cable by using a single tensioning jack, the jack being capable of tightening individual strands of the cable to a selected tension, said method comprising the steps of:

tightening a first strand of the cable with the jack to a selected tension, the first strand being arranged such that its tension can be measured, tightening a second strand of the cable with the jack, thereby simultaneously decreasing the tension of the first strand, while measuring the tension on the first strand until tension on the second strand is equal to the measured tension on the first strand, anchoring the second strand, tightening a third strand of the cable with the jack, thereby simultaneously decreasing the tension of the first and second strands, while measuring the tension on the first strand until tension on the third strand is equal to the measured tension on the first strand, the tension on the second strand thereby also being equal to the tension of the first and third strands, anchoring the third strand, tightening and anchoring all remaining strands using the same procedure used to tighten and anchor the second and third strands to thereby place all strands under equal tension, measuring the final tension of the first strand, releasing the first strand, re-tightening the first strand with the jack to the measured final tension and anchoring the first strand thus tightened.

6. The method of claim 5, wherein said method for placing a multiple-strand cable under tension further comprises an initial step of positioning a tension measuring means on the first strand.

* * * * *